United States Patent [19]
Woolcock

[11] 3,767,277
[45] Oct. 23, 1973

[54] BEARINGS
[75] Inventor: Geoffrey Dennis Woolcock, Oxford, England
[73] Assignee: Evanwoods Limited
[22] Filed: Jan. 31, 1972
[21] Appl. No.: 222,136

[52] U.S. Cl. .................................................. 308/9
[51] Int. Cl. .......................................... F16c 17/16
[58] Field of Search............................ 308/5, 9, 122

[56] References Cited
UNITED STATES PATENTS
3,368,850   2/1968   Wilcox................................. 308/5

Primary Examiner—Charles J. Myhre
Assistant Examiner—Frank Susko
Attorney—George V. Woodling et al.

[57] ABSTRACT

The specification discloses a hydrostatic bearing in which the channels for the passage of the lubricating fluid are defined between a pair of surfaces clamped together, at least one of the surfaces having been roughened as a result of treatment with a high velocity stream of abrasive particles. A linear, thrust and radial bearing are described.

22 Claims, 5 Drawing Figures

Patented Oct. 23, 1973

BEARINGS

BACKGROUND OF THE INVENTION

1. Field of the Invention

This invention relates to a fluid-lubricated bearing of the type generally referred to as a "hydrostatic bearing," that is to say, a bearing comprising a body having a bearing surface and a member mounted by the bearing for movement relative to the bearing surface and in which the member is supported in relation to the bearing surface by a thin film of bearing fluid which is supplied under pressure to a space between the member and the bearing surface so that the member is supported by a thin film of bearing fluid at all times whilst the fluid is supplied to the bearing. Such bearings will be referred to hereinafter as "of the type described."

One practical embodiment of the bearing of the type described is a journal bearing but it should be appreciated that the invention can be applied to other types of bearing such as thrust bearing or a linear bearing, that is a bearing between two surfaces movable rectilinearly relative to each other.

2. Description of the Prior Art

For convenience the problems encountered in a conventional hydrostatic journal bearing will now be discussed.

In the normal construction of a hydrostatic journal bearing the fluid is supplied under pressure through a number of small radial jet orifices arranged at intervals round the shaft. There is a small clearance between the shaft and the bearing surface and in the absence of fluid the shaft would rest on the bottom surface of the bearing leaving a clearance at the top. When fluid is supplied the clearance is still smaller at the bottom than at the top due to the weight of the shaft and any applied load on the shaft acting vertically downwards and this smaller clearance causes the resistance to fluid flow in the region of smaller clearance to be greater than in the region of larger clearance thus increasing the pressure in the fluid at the bottom in relation to that at the top and thus providing a resultant upward force which supports the shaft clear of the bearing surface so that it runs on a film of fluid.

With the normal construction of bearing referred to above the jet orifices must be extremely small for any particular dimension of clearance between the shaft and the bearing. There is an optimum orifice diameter which in the case of small bearing clearances may need to be as small as 0.003 inches. Orifices of this very small size are extremely difficult to machine and unless a very large number of such orifices is provided there will inevitably be zones of lower pressure between adjacent orifices with consequent reduction in load capacity. The actual dimensions involved will differ according to whether the fluid used is liquid or a gas but the overall problam is the same.

Similar problems are encountered in other types of hydrostatic bearing such as a thrust or a linear bearing.

SUMMARY OF THE INVENTION

An object of the invention is to provide a new and improved hydrostatic bearing of the type described wherein the above mentioned problems are overcome or are reduced.

According to the present invention I provide a hydrostatic bearing comprising a body having a bearing surface and a member mounted by the bearing for movement relative to the bearing surface and in which the member is supported in relation to the bearing surface by a thin film of bearing fluid which is supplied under pressure to a space between the member and the bearing surface so that the member is supported by the fluid film at all times whilst bearing fluid is supplied under said pressure to the bearing, including the improvement wherein the body is formed with channels for the passage of bearing fluid, said channels extending to said space between the member and the bearing surface and are defined between a pair of complementary surfaces on first and second body parts maintained in fixed relationship to each other, said first and second body parts being impervious to the passage of bearing fluid, and at least one of which surfaces is roughened to provide a plurality of evenly and randomly distributed pits, substantially all of said pits being interconnected to adjacent pits to permit flow of bearing fluid therebetween, said pits constituting said bearing fluid channels.

The bearing may be a journal bearing and the member may be a cylindrical shaft and said bearing surface may define a cylindrical surface of slightly larger diameter than the diameter of said shaft within which said shaft is disposed and said channels may extend between a plenum chamber and said cylindrical surface and may be defined between a pair of annular flat surfaces maintained in fixed relationship to each other, at least one of which surfaces has been roughened as a result of treatment with a high velocity stream of abrasive particles.

Alternatively, the bearing may be a thrust bearing wherein the member has an end surface extending transversely of the axis of rotation of the member and wherein the body has a portion thereof defining a bearing surface of a shape complementary to the end surface of the member, and wherein said air feed channels extend to the space between said end surface and the bearing surface at a position spaced inwardly of the outer periphery of the bearing surface of the body.

Alternatively, the bearing may be a linear bearing and said body may include a rectilinearly extending bearing surface and said member having a bearing surface of complementary configuration and wherein said surfaces defining said air feed channels in the body extend in the direction of relative movement between the member and the body.

The surfaces may be held together under pressure.

Such a construction gives a multiplicity of small channels which take the place of the jet orifices referred to above and which permit a much more uniform distribution of fluid around the shaft. The channels are provided by a plurality of evenly and randomly distributed pits of varying size, substantially all of the pits being inter-connected to adjacent pits to permit flow of fluid therebetween. In addition, the mechanical treatment necessary to obtain these channels is greatly simplified since it is merely a question of roughening the respective surface or surfaces to a sufficient extent to provide the required size of channel. If subsequently the channels tend to become clogged with dirt it is then only necessary to dismantle the assembly, to clear the roughened surface and then to reassemble the bearing again.

The actual size of channel required, and hence the size of the pits which is required, and hence the degree of roughening necessary is dependent on the overall characteristics of the bearing, that is to say, the diameter of the shaft, the width of the clearance between the shaft and the bearing surface, the available supply pressure of the fluid to be used, and the viscosity of the fluid. The desired size of pit is obtained by appropriate selection of the size and velocity of the abrasive particles and the duration of the treatment. Basically the roughening treatment is similar to the well known sandblasting or shot-blasting processes. In such processes the stream of abrasive particles ( which term for the purposes of the present specification is used to include the use of steel shot ) is directed at an angle of for example, 45° to the workpiece. This has both a roughening and a cutting action. The impact of the particles on the surface being treated tends to displace the material of the surface and to form it into adjacent ridges and depressions. Since the movement of the stream of particles has a component parallel to the surface, however, there is an overall " sweeping " effect and material tends to be displaced towards one edge of the material and eventually to be removed from that edge. Although this conventional form of blasting process can be used for the roughening of a surface in accordance with the present invention it has been found that improved results are obtained if the stream of particles is directed normally. Under these circumstances there is no component of the motion parallel with the surface so that there is no tendency for material to be removed and the effect is merely to accentuate the displacement of material to define adjacent ridges and depressions. In order to maintain uniform treatment the surface may be rotated in the blast stream.

It has been found in practice that much improved results are obtained if the material is treated with abrasive particles to a greater extent than that necessary to produce the desired size of channels and the material is then lapped with a suitable abrasive material to reduce the size of the pits so as to give the precise size of channels required. This enables a much more precise control to be maintained over the form of the channels and hence over the characteristics of the bearing.

If the material being roughened is steel the effect of the treatment is to introduce a measure of work-hardening which is advantageous in prolonging the life of the component. Other metals than steel can be used, however, and even non-metallic materials such as hard ceramics which are found to give particularly good results.

The channels for the passage of the lubricating fluid may either be defined between one roughened surface and one flat surface or between two roughened surfaces, the choice between these two alternatives depending on the required size of channel and the extent to which a single surface can conveniently be roughened by the blasting treatment. If the required depth of channel can be obtained merely by roughening one of the surfaces there is no advantage in treating both surfaces and the engaging surface may be left flat.

In order to provide the engaging surfaces defining the channels the body portion of the bearing must be formed as at least two parts divided from one another. The engaging surfaces of either one or both these parts are then required to be roughened. As a matter of convenience, however, the roughening may be applied to a component of the body portion which is sandwiched between other components. This provides two pairs of engaging surfaces and the component in question may be roughened on one or both of its faces. In a particular construction two such components are situated towards opposite ends of the body portion.

BRIEF DESCRIPTION OF THE DRAWINGS

Constructions of bearing in accordance with the invention will now be described in more detail by way of example with reference to the accompanying drawings in which.

DESCRIPTION OF PREFERRED EMBODIMENT

Figure 1:
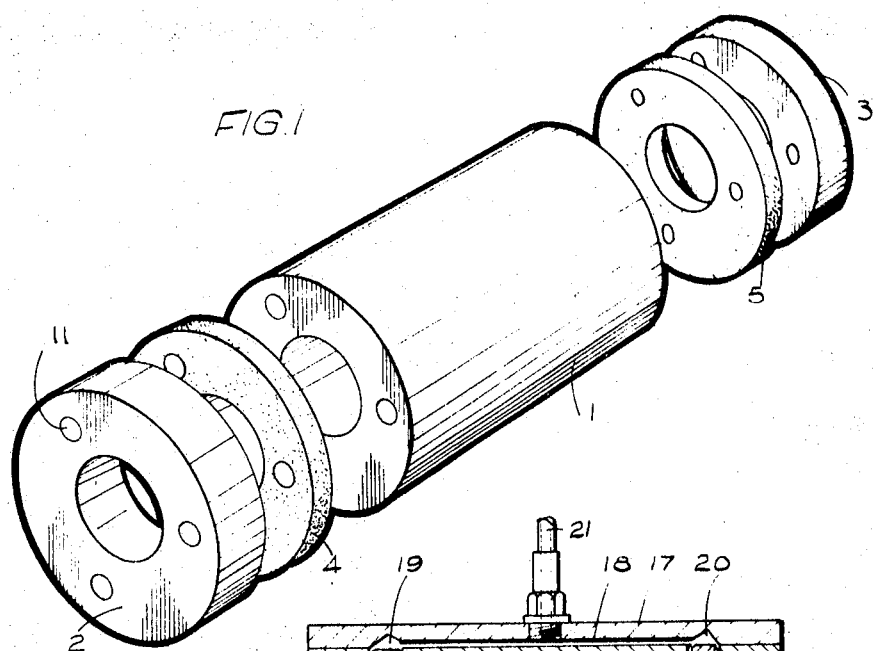
FIG. 1 is an exploded perspective view of one construction of journal bearing embodying the invention.

Turning first to FIG. 1, the body portion of the bearing comprises a main central part 1, and end parts 2 and 3. Between these are sandwiched relatively thin plates 4 and 5 which, as illustrated, are roughened as hereinafter to be described on both sides but may, if required, be roughened on only one side. When the plates are roughened on both sides a total of four sets of channels for the passage of fluid are provided so that no roughening is required to the main body portions 1, 2 and 3. All the components so far described are formed with bolt holes 11 and FIG. 2 shows the components assembled and held together by bolts 12.

Figure 2:
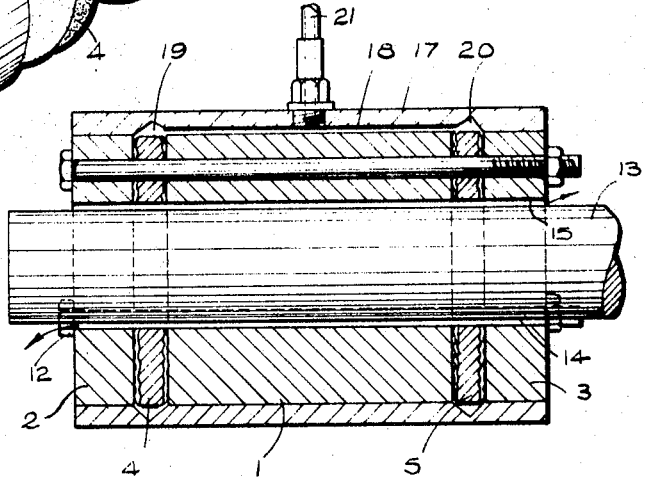
FIG. 2 is an axial sectional view of the assembled bearing of FIG. 1.

In the view of FIG. 2 a shaft 13 is shown in position in the bearing and for simplicity of illustration the clearance 14 at the bottom is shown as equal to that 15 at the top. In practice, when the bearing is not in operation i.e., when no fluid is being supplied to the bearing there would be no clearance 14 at the bottom at all and when operating the clearance 14 would be smaller than that 15 for the reasons already described. The assembly of parts 1, 2 and 3 together with the plates 4 and 5 is surrounded by an outer jacket 17 formed with an internal slot 18 communicating with circumferential grooves 19 and 20 encircling the plates 4 and 5. The Slot 18 together with the grooves 19 and 20 defines a plenum chamber to which fluid under pressure is supplied by way of a connection 21. From there the fluid flows inwardly along the channels defined between the roughened surface of the plates 4 and 5 and the smooth engaging surfaces of the parts 1, 2 and 3. Since the grooves 19 and 20 completely encircle the plates 4 and 5 there is a uniform flow of fluid.

The fluid may be a liquid, for example, oil, or a gas, for example, air.

The degree of roughening of the plates 4 and 5 is selected in accordance with the fluid to be used and also in accordance with the other variables described hereinbefore.

The plates are roughened by treatment with abrasive particles as described hereinbefore.

The end pressure exerted by the bolts 12 tends to press the ridges formed in the roughened surfaces of the plates 4 and 5 into the engaging surfaces on the parts 1, 2 and 3, thus tending to interlock these components and avoiding the need for the provision of dowels or registers which would otherwise be necessary in order to prevent relative movement of the components.

The avoidance of such dowels or registers represents a major simplification in that they are notoriously difficult to manufacture to the required degree of accuracy.

Figure 3:
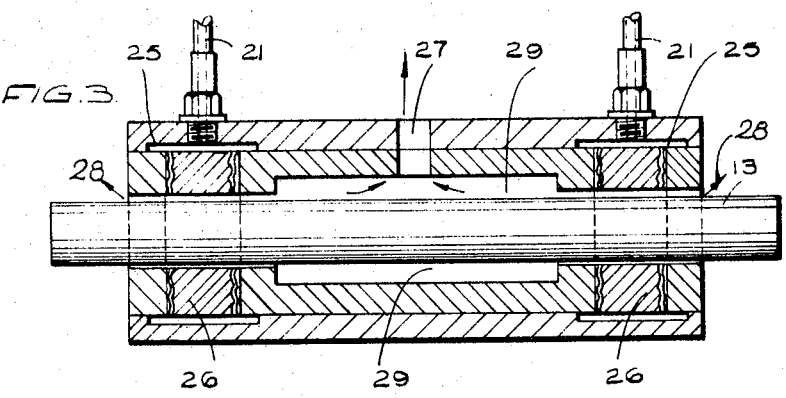
FIG. 3 is an axial sectional view of a modified construction of journal bearing embodying the invention.

In the bearing shown in FIG. 3 the connection 21 is duplicated to supply two separate plenum chambers 25 from which fluid flows inwardly along four separate sets of channels defined by the roughened surfaces on opposite sides of plates 26 which are rather thicker than the plates 4 and 5. The plates 26 are spaced apart by a distance considerably greater than their own thicknesses. Such an assembly is suitable for use with a grinding spindle, for example. Owing to the length of the assembly, central exhaust outlets 27 are connected to a relieved portion 29 so that fluid escapes not only at the ends of the assembly, as indicated at 28, but also along the exhaust outlets 27, so that there is a flow of fluid along the full length of the bearing. The surfaces are roughened, as described hereinbefore, by treatment with a high velocity stream of abrasive particles.

Bearings in accordance with the invention can take any size or proportions in accordance with the requirements.

By way of example, dimensions will now be given for a specific bearing having the construction, but not the proportions, of FIGS. 1 and 2.

| | Inches |
|---|---|
| Shaft diameter | 2 |
| Bearing length | 2 |
| Radial clearance between dhaft and bearing | 0.0007 |
| Distance between plates 4 and 5 | 1 |
| Outside diameter of bearing | 3 |

The plates 4 and 5 were made of rust resisting steel and the surfaces were roughened by treatment with 250 micron-sized abrasive particles directed normally to the surface for a period of 15 seconds with a propellant air pressure of 80 p.s.i.

The roughened surfaces comprises a large number of pits of varying size which are evenly and randomly distributed over the roughened surfaces with substantially all of the pits breaking into adjacent pits or being broken into by adjacent pits whereby the bearing fluid can flow through the pits. The pits were approximately 0.001 in. to 0.003 in. deep, and of approximately 0.00001 sq. in. to 0.00008 sq. in. in area.

In operation the pressure applied depends on the nature of the fluid, but when using air a typical pressure is 80 p.s.i. and when using oil a typical pressure is 200 - 300 p.s.i.

By way of a second example the dimensions and manufacturing sequence for a bearing having the construction, but not the proportions, of FIG. 3 will now be described.

Two rings 3 inches outside diameter × 2 inches inside diameter × ½ inches thick are machined with ground faces, four holes drilled and counterbored to suit cap head screws. One tube 3 inches outside diameter × 2 inches inside diameter × 5 inches long is machined with ground faces, four tapped holes each end and one exhaust hole in the centre. Two rings 3 inches outside diameter × 2 inches inside diameter × 1 inch thick are machined with ground faces, four clearance holes for screws. The 1 inch thick rings are made of stainless steel.

The two 1 inch thick rings are then placed on a turntable and rotated at 140 rev. per min. in a shot blasting cabinet, the nozzle being 8 inches above the component. It is blasted at 20 p.s.i. for 20 seconds using a 250 micron-sized abrasive. This process is repeated for the other side of the rings. Pits of the same nature as described in the first example were produced.

After blasting, the faces are lapped to give an air flow of 35 cubic feet per hour at 80 p.s.i. through each of the channels, defined by the shot blasted faces, when all five components are bolted together. After lapping the pits were approximately 0.0004 inch to 0.001 inch deep and approximately 0.00001 sq.in. to 0.00008 sq.in. in area.

The bore is then honed to size holding a tolerance of 0.0001 inch. The unit is then stripped down, cleaned, all fraze removed and reassembled using an expanding mandrel.

A shaft is produced 8 inches long with two journals 2 inches long at the ends, the diameter being 0.0012 inch less than the bore diameter of the bearing, the centre 4 inches being 0.040 inch smaller. The bearing is then assembled into a housing fitted with air feed holes to each pair of channels. The shaft, when the air feed pressure is 80 p.s.i., will carry a static load of 270 lbs. at a deflection rate of 470,000 lbs./inch.

By way of a third example the dimensions and manufacturing sequence for another bearing having the construction, but not the proportions, of FIG. 3 will be described.

Two rings 4 inches outside diameter × 3 inches inside diameter × ¾ inch thick are machined with ground faces, four holes drilled and counterbored to suit cap head screws. One tube 4 inches outside diameter × 3 inches inside diameter × 7½ inches long is machined with ground faces, four tapped holes each end and one exhaust hole in the centre. Two rings made of stainless steel and of 4 inches outside diameter × 3 inches inside diameter × 1½ inches thick are machined with ground faces, four clearance holes for screws.

The two 1½ inches thick rings are then placed on a turntable and rotated at 140 rev. per min. in a shot blasting cabinet, the nozzle being 8 inches above the component. It is blasted at 20 p.s.i. for 30 seconds using a 250 micron size abrasive. The process is then repeated for the other side of the rings.

After blasting, the faces are lapped to give an air flow of 4 inches cubic feet per hour at 80 p.s.i. through each of the channels, defined by the shot blasted faces, when all five components are bolted together. The pits produced after blasting and lapping were as described in example 2.

The bore is then honed to size holding a tolerance of 0.0001 inch. The unit is then stripped down, cleaned, all fraze removed and reassembled using an expanding mandrel.

A shaft is produced 12 inches long with two journals 3 inches long at the ends, the diameter being 0.0012 inch less than the bore diameter of the bearing, the centre 6 inches being 0.040 inch smaller. The bearing is then assembled into a housing fitted with air feed holes to each pair of channels. The shaft, when the air feed pressure is 80 p.s.i. will carry a static load of 600 lbs. at a deflection rate of 1,000,000 lbs./inch.

It will be understood that the constructions described above are merely examples of a wide variety of constructions in accordance with the invention. In the simplest version, the body of the bearing is made of only two portions to provide a single set of channels. This basic construction can be doubled after the manner of that of FIG. 3, as can also the construction of FIGS. 1 and 2. Similarly, one half of the construction of FIG. 3 can be used as a single short bearing. For a very long bearing any required number of sets of channels can be achieved by use of an appropriate number of body components.

Figure 4:
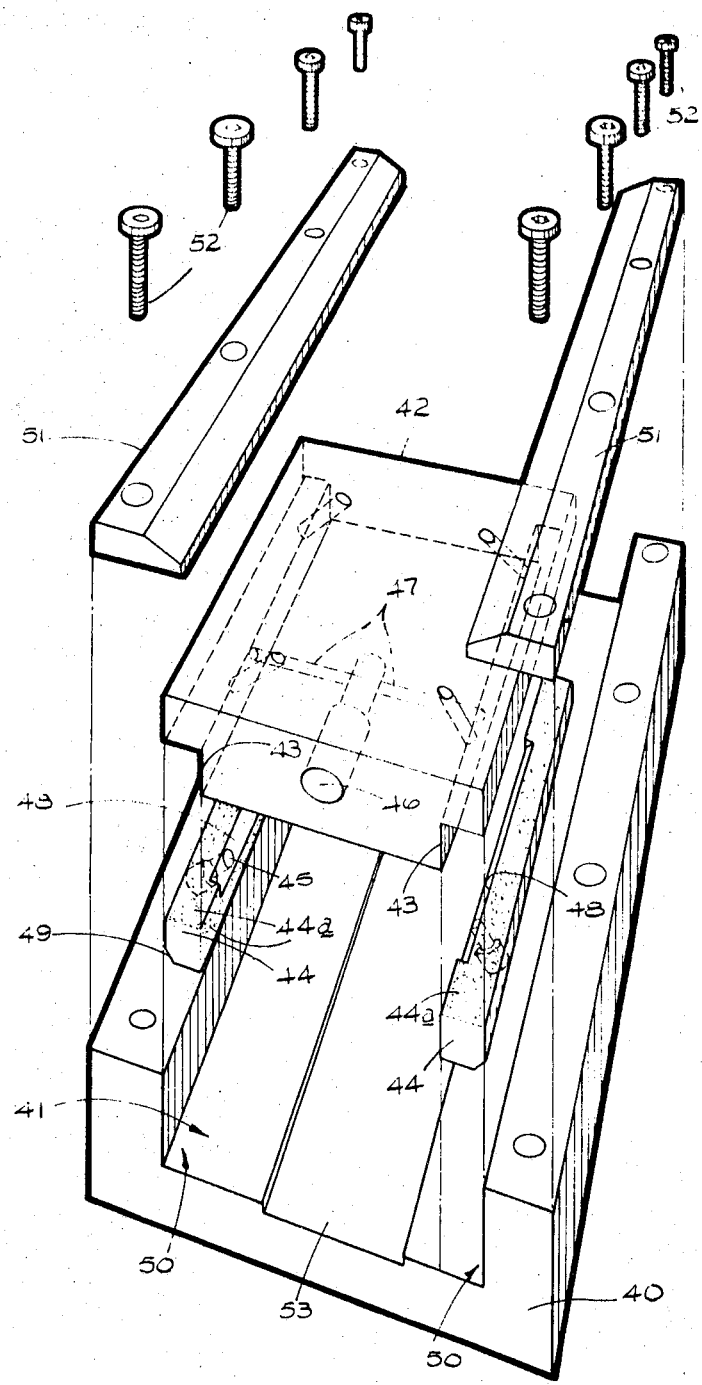
FIG. 4 is an exploded perspective view of one construction of linear bearing embodying the invention.

By way of a fourth example a linear bearing shown in FIG. 4 will now be described. The bearing comprises a base member 40 which may be of any desired external configuration and which is provided with a U-section channel 41 therein to receive a sliding body 42. The sliding body 42 is of generally T-shape in cross section, having two rebates 43 formed along its two lower sides. The rebates 43 receive square elongated members 44 made of stainless steel, which are secured to the body 42 by screws 45. Two adjacent faces 44a of the elongated members 44 are shot blasted, as to be described hereinafter, and these shot blasted faces are maintained urged into contact with the faces of the rebates 43 by the screws 45. A central longitudinally extending passage 46 is formed in part of the body 42 and transversely extending passages 47 are provided to extend from the passage 46 to the corners of the rebates 43.

Intermediate their ends the square section members 44 have a chamfered portion 48 which, in conjunction with the corner of the rebate 43, provides a chamber for air feed thereto from the central feed passage 46 via the transverse passages 47.

The diagonally opposite corner of each elongated member 44 is also chamfered as shown at 49 to provide an exhaust chamber and small clearance spaces are provided between the sliding body 42 and the base member 40 in the regions indicated at 50.

Longitudinally extending retaining members 51 are provided, secured to the member 40 by screws 52 to retain the sliding body 42 in position. If desired, further fluid feed channels can be provided on the body to provide a hydrostatic bearing between the body 42 and the retaining members 51.

In use, air under pressure is fed into the central passage 46 and then enters the chambers formed by the chamfered parts 48 through the transversely extending passages 47. The air then passes through the fine channels provided by the shot blasted surfaces 44a of the elongated members 44 to the bearing faces and then the air exhausts either through a central exhaust passageway 53 or through the passage ways provided by the other chamfered edges 49, or upwardly to escape from the top of the body.

In this case the faces 44a of the elongated members 44 are shot blasted in a manner similar to that desribed hereinbefore in connection with the second and third examples, i.e., they are shot blasted with a nozzle about 8 inches above the component, so that the shot is directed normally upon the component and are blasted at about 20 p.s.i., using a coarse grain abrasive of controlled size. During this shot blasting operation the elongated members are reciprocated backwards and forwards in front of the nozzle for appropriate lengths of time to give the desired depth of passage.

After blasting, the faces are lapped to give an air flow of about 10 cubic feet per hour per square inch of treated surface at 80 p.s.i. Again the pits produced were as described in example 2.

It will be appreciated that each surface of the elongated members to be shot blasted is shot blasted separately, the component 44 being turned through 90° at the end of each shot blasting operation.

By way of a fourth example, a rotary thrust bearing is described in connection with FIG. 5, and this rotary thrust bearing also acts as a radial bearing.

Figure 5:
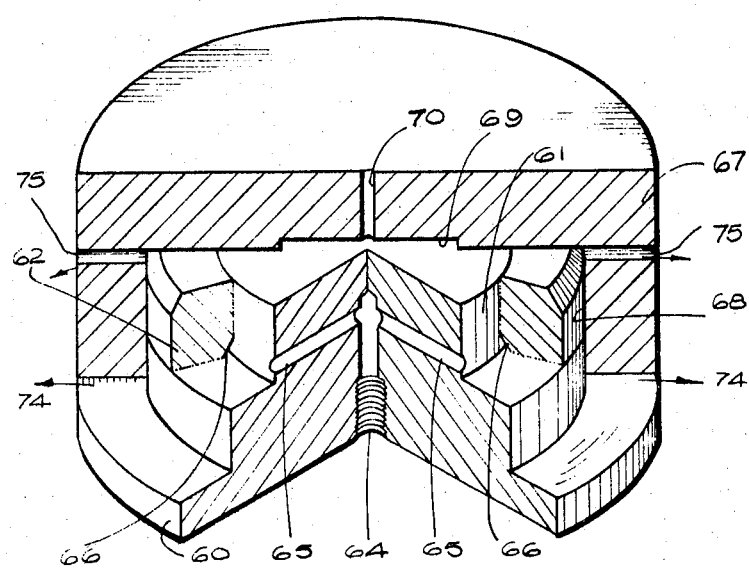
FIG. 5 is a perspective view of one construction of a rotary thrust bearing embodying the invention.

In this embodiment, referring now to FIG. 5, the bearing comprises a fixed body 60 of disc configuration having an axially extending cylindrical boss 61 formed integrally therewith. An annular member 62 of square cross section is secured to the member 60 in the shoulder formed between the member 60 and the boss 61 and is secured in position by screws, not shown. An axially directed feed passage 64 is formed in the body 60 and radially extending feed passages 65 radiate therefrom to the corner 66 between the boss part 61 and the annular member 62.

The annular member 62 has two of its adjacent surfaces shot blasted, as to be described hereinafter, and the corner between the shot blasted surfaces is chamfered, as indicated at 66.

A rotatable member 67 is of generally cylindrical configuration, having a generally cylindrical recess 68 formed therein which receives the fixed body 60. A central shallow recess 69 is formed in the rotatable member 67 and an exhaust passage 70 is formed therein.

In use, air under pressure is fed into the feed passage 64 and via the passages 65 to the chamber formed by the chamfered part 66 and then through the channels formed by the shot blasted surfaces of the annular member 63, and hence into the bearing surfaces between the fixed member 60 and the rotatable member 67. The air from the bearing surfaces exhausts from the bottom of the bearing in the region indicated at 74 and via the exhaust passages 70 and 75.

The shot blasting operation on the annular member is performed in a similar manner to the examples described hereinbefore.

So far as the annular surface is concerned, this is shot blasted by placing the annular member on a turntable and rotating at 140 revs. per minute in a shot blasting cupboard, with the nozzle being placed 8 inches above the component. It is blasted at 20 p.s.i. for an appropriate period of time to give the desired depth of passage, using a coarse grain abrasive of controlled size.

For the internal, cylindrical, surface of the annular ring, the surface may either be shot blasted with a nozzle placed within the annulus so that the shot is directed normally on to the surface, in which case the distance between the nozzle and the surface will be less than 8 inches, and hence a corresponding lower pressure and time will be used or alternatively the shot may be directed onto the surface at an angle from a nozzle placed externally of the annular ring so that in this case the shot will be directed on to the surface at a slight angle.

Again, after blasting, the faces are lapped to give an air flow of about 10 cubic feet per hour per square inch of treated surface at 80 p.s.i. through the channels. The pits produced were as described in example 2.

It will be appreciated from the above examples that the terms " body " and " member" are used herein to refer to the relatively moving parts of a bearing, and that the term " body " is not used exclusively to refer to a part of the bearing which is fixed relative to the surroundings, not is the term " member " used exclusively to refer to the part which is movable relative to the surroundings.

All the component parts of the bearings, with the exception of the feed channels, are, of course, impervious to the passage of the bearing fluid.

What we then claim is:

1. A hydrostatic bearing comprising a body having a bearing surface and a member mounted by the bearing for movement relative to the bearing surface and in which the member is supported in relation to the bearing surface by a thin film of bearing fluid which is supplied under pressure to a space between the member and the bearing surface so that the member is supported by the fluid film at all times whilst bearing fluid is supplied under said pressure to the bearing, including the improvement wherein the body is formed with channels for the passage of bearing fluid, said channels extending to said space between the member and the bearing surface and are defined between a pair of complementary surfaces on first and second body parts maintained in fixed relationship to each other, said first and second body parts being impervious to the passage of bearing fluid, and at least one of which surfaces is roughened to provide a plurality of evenly and randomly distributed pits, substantially all of said pits being interconnected to adjacent pits to permit flow of bearing fluid therebetween, saids pits constituting said bearing fluid channels.

2. A bearing according to claim 1, wherein the bearing is a journal bearing and the member is a cylindrical shaft and wherein said bearing surface defines a cylindrical surface of slightly larger diameter than the diameter of said shaft and within which cylindrical surface said shaft is disposed and wherein said channels extend between a plenum chamber and said cylindrical surfaces and are defined between a pair of annular flat surfaces maintained in fixed relationship to each other.

3. A bearing according to claim 2, wherein said surfaces are held together under axial pressure.

4. A bearing according to claim 3, in which each roughened surface is formed on a component of the body in the form of an annular plate, which component is sandwiched between other components.

5. A bearing according to claim 1, wherein the bearing is a thrust bearing and wherein the member has an end surface extending transversely of the axis of rotation of the member and wherein the body has a portion thereof defining a bearing surface of a shape complementary to the end surface of the member, and wherein said channels extend to the space between said end surface and the bearing surface at a position spaced inwardly of the outer periphery of the bearing surface of the body.

6. A bearing according to claim 5, wherein said complementary surfaces between which said channels are defined are of cylindrical configuration and are coaxial with the axis of rotation of the member.

7. A bearing according to claim 6, wherein the body comprises a core member of stepped cylindrical configuration, having one part of a larger diameter than another part of a smaller diameter, and there being a shoulder extending radially outwardly from the periphery of the smaller diameter part, and there being a ring member having two adjacent surfaces mutually inclined at right angles and positioned on said shoulder, said adjacent surfaces of the ring member being positioned so that one surface, of cylindrical configuration, is positioned adjacent the wall of the smaller diameter part of the core member whilst the other surface, of annular configuration, is positioned adjacent said shoulder, and wherein the wall of the smaller diameter part and the cylindrical wall of the ring member define said feed channels therebetween.

8. A bearing according to claim 5, wherein the bearing is a combination thrust and journal bearing, the member including a cylindrical portion adapted to encircle a portion of the body and wherein second bearing fluid channels are provided extending from a plenum chamber to the space between the cylindrical portion and the body, and said second channels being defined between a pair of complementary surfaces maintained in fixed relationship to each other, at least one of said surfaces being roughened to provide a plurality of evenly and randomly distributed pits, substantially all of said pits being interconnected to adjacent pits to permit flow of bearing fluid therebetween, said pits constituting said second bearing fluid channels.

9. A bearing according to claim 8, wherein said second channels are defined between surfaces of annular configuration and lying in a plane normal to the axis of rotation of the member.

10. A bearing according to claim 1, wherein the bearing is a linear bearing and said body includes a rectilinearly extending bearing surface and said member has a bearing surface of complementary configuration thereto and wherein said surfaces defining said channels in the body extend in the direction of relative movement between the member and the body.

11. A bearing according to claim 10, wherein said surfaces between which said channels are defined are planar and extend normal to said bearing surfaces.

12. A bearing according to claim 11, wherein the body has a core part having longitudinally extending shoulders on opposite sides thereof, the surfaces of the core part defining each shoulder including a surface which extends normal to said bearing surfaces and wherein an elongate member having two mutually inclined adjacent surfaces is positioned in each of said shoulders, and wherein said surfaces and the surfaces of the elongate members adjacent thereto comprise said surfaces defining the feed channels.

13. A bearing according to claim 10, wherein the body is provided with second bearing fluid channels extending transversely of the body normal to the first mentioned channels and being defined between a pair of complementary surfaces maintained in fixed relationship to each other, at least one of said surfaces being roughened to provide a plurality of evenly and randomly distributed pits, substantially all of said pits being interconnected to adjacent pits to permit flow of bearing fluid therebetween, said pits constituting said second bearing fluid channels.

14. A bearing according to claim 1, wherein the or at least one of the roughened surfaces has been lapped.

15. A bearing according to claim 1, wherein the pits have a depth lying in the range from 0.004 in. to 0.003 in.

16. A bearing according to claim 1, wherein the pits have an area lying in the range from 0.00001 sq. in. to 0.00008 sq. ins.

17. A method of manufacturing a fluid lubricated hydrostatic bearing as claimed in claim 1, including the steps of subjecting a surface of a component of the bearing to treatment with a high velocity stream of abrasive particles for a length of time sufficient to produce the required degree of roughening so that the surface, in co-operation with a surface of another component of the bearing, defines feed channels for the lubricating fluid of the bearing.

18. A method according to claim 17, wherein the stream of abrasive particles is directed substantially normally to the surface.

19. A method according to claim 17, wherein the surface is lapped subsequent to said treatment with a high velocity stream of abrasive particles.

20. A method according to claim 17 wherein the pits have a depth lying in the range from 0.0004 in. to 0.003 in.

21. A method according to claim 17 wherein the pits have an area lying in the range from 0.00001 sq. in. to 0.00008 sq.in.

22. A bearing according to claim 1 wherein said first and second body parts are made of metal.

* * * * *